United States Patent
Tolkacz et al.

(10) Patent No.: US 9,260,105 B2
(45) Date of Patent: Feb. 16, 2016

(54) SYSTEM AND METHOD OF POWER MANAGEMENT FOR A HYBRID VEHICLE

(71) Applicant: GM GLOBAL TECHNOLOGY OPERATIONS LLC, Detroit, MI (US)

(72) Inventors: Joseph M. Tolkacz, Novi, MI (US); Norman Schoenek, Novi, MI (US); Min-Joong Kim, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 129 days.

(21) Appl. No.: 13/959,105

(22) Filed: Aug. 5, 2013

(65) Prior Publication Data
US 2015/0039162 A1 Feb. 5, 2015

(51) Int. Cl.
| | |
|---|---|
| B60L 11/00 | (2006.01) |
| B60W 20/00 | (2006.01) |
| B60W 10/06 | (2006.01) |
| B60W 10/08 | (2006.01) |
| B60W 10/10 | (2012.01) |
| B60W 10/26 | (2006.01) |
| B60K 6/52 | (2007.10) |
| B60W 10/11 | (2012.01) |

(52) U.S. Cl.
CPC .............. *B60W 20/10* (2013.01); *B60K 6/52* (2013.01); *B60W 10/06* (2013.01); *B60W 10/08* (2013.01); *B60W 10/10* (2013.01); *B60W 10/11* (2013.01); *B60W 10/26* (2013.01); *B60W 2510/246* (2013.01); *B60W 2540/10* (2013.01); *B60W 2550/142* (2013.01); *B60W 2710/0677* (2013.01); *Y10S 903/93* (2013.01)

(58) Field of Classification Search
CPC ..................................................... B60W 20/00
See application file for complete search history.

(56) References Cited

U.S. PATENT DOCUMENTS

| | | | | |
|---|---|---|---|---|
| 6,205,379 | B1 * | 3/2001 | Morisawa | B60L 11/14 180/165 |
| 6,998,727 | B2 * | 2/2006 | Gray, Jr. | B60K 6/10 290/40 A |
| 8,335,602 | B2 * | 12/2012 | Fauvel | B60K 6/52 180/233 |
| 8,676,415 | B2 * | 3/2014 | Okubo | B60K 6/365 180/65.265 |

(Continued)

OTHER PUBLICATIONS

Hasan, S.M., Hybrid Electric Vehicle Powertrain: On-line Parameter Estimation of an Induction Motor Drive and Torque Control of a A PM BLDC Starter-generator, May 2008. Electronic Thesis or Dissertation, Retrieved from https://etd.ohiolink.edu/.*

*Primary Examiner* — Thomas G Black
*Assistant Examiner* — Ana Thomas
(74) *Attorney, Agent, or Firm* — Quinn Law Group, PLLC

(57) ABSTRACT

A system and method of managing power in a hybrid vehicle are provided. The system includes an engine, first and second electronic power components, a power storage device, and a controller. The power storage device is configured to supply a power output to the second electronic power component necessary for the second electronic power component to drive a second set of drive wheels, in an electronic all-wheel drive mode. In steep grade environments, the power storage device is depleted at a higher rate, and may require a power input in addition to the power input of a conventional charge to adequately supply the second electronic power component with adequate power. To provide this power, the controller executes a series of control steps to increase a power output of the first electronic power component, by increasing the speed of the engine, thereby providing continuous power to the power storage device.

13 Claims, 2 Drawing Sheets

(56) References Cited

U.S. PATENT DOCUMENTS

| | | | | |
|---|---|---|---|---|
| 8,725,335 B2* | 5/2014 | Tolkacz | B60W 10/06 | 701/22 |
| 8,812,182 B2* | 8/2014 | Hennings | B60K 6/52 | 180/242 |
| 2009/0082154 A1* | 3/2009 | Iwase | B60K 6/445 | 475/150 |
| 2010/0076657 A1* | 3/2010 | Jinno | B60K 6/448 | 701/70 |
| 2012/0022737 A1* | 1/2012 | Kumazaki | B60K 6/445 | 701/22 |
| 2013/0253744 A1* | 9/2013 | Nishimine | B60W 10/08 | 701/22 |
| 2013/0261865 A1* | 10/2013 | Toki | B60K 6/48 | 701/22 |
| 2013/0284125 A1* | 10/2013 | Zollner | B60K 6/48 | 123/2 |
| 2013/0296112 A1* | 11/2013 | Yamazaki | B60W 20/00 | 477/5 |
| 2013/0297113 A1* | 11/2013 | Banker | B60W 20/00 | 701/22 |
| 2013/0332015 A1* | 12/2013 | Dextreit | B60K 6/448 | 701/22 |
| 2014/0088813 A1* | 3/2014 | Kobayashi | B60L 15/2045 | 701/22 |
| 2014/0114513 A1* | 4/2014 | Treharne | B60W 10/06 | 701/22 |
| 2014/0136035 A1* | 5/2014 | Boskovitch | B60K 6/34 | 701/22 |
| 2014/0200755 A1* | 7/2014 | Sisk | B60L 11/12 | 701/22 |
| 2014/0229044 A1* | 8/2014 | Dai | B60W 20/30 | 701/22 |
| 2014/0277874 A1* | 9/2014 | Crombez | B60W 10/06 | 701/22 |
| 2014/0297088 A1* | 10/2014 | Ando | B60K 6/445 | 701/22 |
| 2014/0336861 A1* | 11/2014 | Huber | B60R 16/03 | 701/22 |
| 2015/0018152 A1* | 1/2015 | Kato | B60W 20/1084 | 475/5 |

* cited by examiner

SYSTEM AND METHOD OF POWER MANAGEMENT FOR A HYBRID VEHICLE

TECHNICAL FIELD

The present teachings generally include a system and method of power management for a hybrid vehicle.

BACKGROUND

Some hybrid vehicles use a primary power source for the majority of the vehicle's propulsion needs and supplement that primary power source with an auxiliary power source, as needed. An auxiliary power source can benefit a hybrid vehicle in certain driving conditions, such as scaling large grades, i.e., steep inclines and declines.

In order to utilize the auxiliary power source, the auxiliary power source requires electric power from a power storage device. When climbing a significant grade, the auxiliary power source may diminish the stored charge of the power storage device more quickly, while operating in an electric-only mode or a hybrid mode.

SUMMARY

A system and method of managing power in a hybrid vehicle are provided. The system includes an engine, a transmission, first and second electronic power components, a power storage device, and a controller. The power storage device is configured to supply a power output to the second electronic power component to allow the second electronic power component to drive the vehicle via a second set of drive wheels. The power storage device is further configured to receive a power input from the first electronic power component.

In steep grade environments, the second electronic power component depletes the charge of the power storage device at a higher rate. Thus, the power storage device may require a power input in addition to the power input of a conventional charger to supply the second electronic power component with adequate power to drive the second set of drive wheels. To provide this additional power, the controller executes a series of control steps to increase the power output of the first electronic power component. The power output of the first electronic power component is increased by increasing the speed of the engine. The increased power output of the first electronic power component thereby provides the needed additional power to the power storage device and enables the power storage device to provide continuous power to the second electronic power component.

The steps executed by the controller, to produce continuous power to the power storage device, may include: determining a current state of charge of the power storage device and a target state of charge of the power storage device; calculating a target power output of the first electronic power component required to increase the state of charge of the power storage device from the current state of charge to the target state of charge; predicting a predicted resultant temperature of the first electronic power component as a result of producing the target power output; comparing the predicted resultant temperature of the first electronic power component to a predetermined temperature threshold for the first electronic power component; and executing one of a first control action when the predicted resultant temperature is below the predetermined temperature threshold and a second control action if the predicted resultant temperature exceeds the predetermined temperature threshold.

In executing the first control action, the controller commands the transmission to complete a gear downshift to increase the operating speed of the engine, thereby increasing the power output of the first electronic power component to allow the first electronic power component to produce the target power output required by the power storage device to supply continuous power to the second electronic power component.

In executing the second control action, the controller generates a revised power output for the first electronic power component, which allows the first electronic power component to supply the maximum power output to the power storage device allowed by hardware temperature constraints. The revised power output is based on a comparison of the predetermined temperature threshold to a series of predetermined values in a look-up table; and commands the transmission to complete a gear downshift to increase the operating speed of the engine to allow the first electronic power component to produce the revised power output.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

Referring to Figures, a system and method of managing power in a hybrid-electric vehicle 10 are provided.

Figure 1:
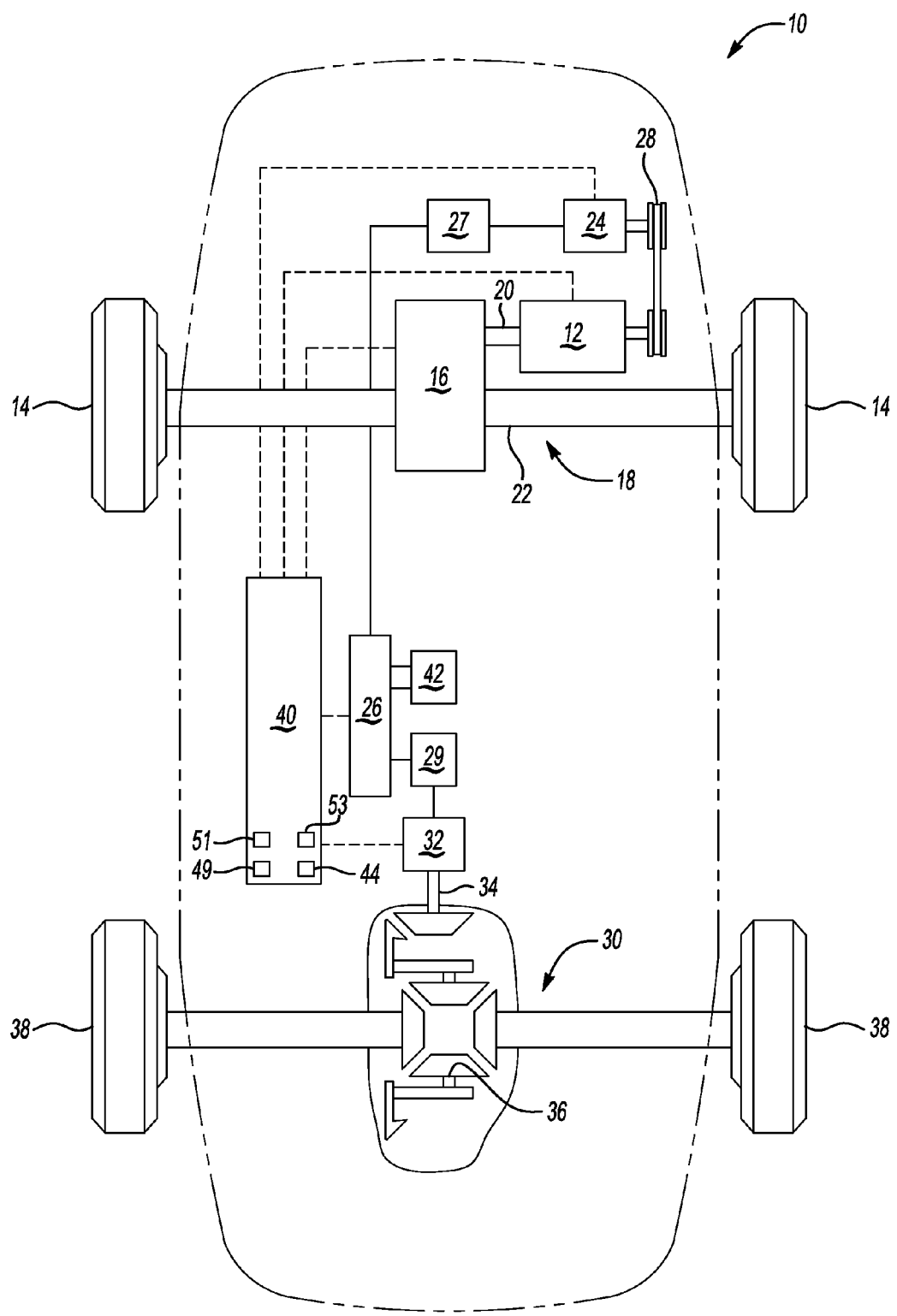
FIG. 1 is a schematic illustration of an all-wheel drive hybrid vehicle.

FIG. 1 illustrates a hybrid vehicle 10 equipped with an electric all-wheel drive system. The vehicle 10 includes an internal combustion engine 12 configured to drive the vehicle via a first set of wheels 14 through a transmission 16 and a first axle 18.

The transmission 16 may be one of an automatic and manual transmission. The transmission 16 may be an automatic transmission, such as a multi-speed automatically-shiftable transmission that utilizes a gear train and multiple torque transmitting devices to generate discrete gear ratios between an input member 20 and an output member 22 of the transmission.

Although not shown, the existence of various gear trains, constructed from combinations of a range of planetary gear sets, and torque transmitting devices, such as clutches and/or brakes combined to form a functional automatic transmission, which will be appreciated by those skilled in the art.

Alternatively, the transmission 16 may be a manual transmission, such as a multi-speed manual transmission, which includes a manual gear shift selector and a cluster of gear sets.

The shift selector is operable for engaging each gear set to produce a specific gear ratio between the input 20 and the output 22.

The vehicle 10 also includes a first electronic power component 24. The first electronic power component 24 may be a first motor-generator unit, as shown in the example embodiment in FIG. 1. The first electronic power component 24 may be connected directly to the engine 12 via a belt 28. The first electronic power component 24 is further operatively connected to a power storage device 26 such as a high voltage battery or the like, having an output voltage of from about 60 VDC to about 300 VDC or higher. When the first electronic power component 24 operates as a motor, it receives electrical energy from the power storage device 26 to drive the transmission 16 or crank the engine 12. When the first electronic power component 24 operates as a generator, it transmits electrical energy to the power storage device 26 to charge the power storage device 26.

The hybrid vehicle 10 additionally includes a second axle 30, which is configured as a fully electronic axle. The second axle 30 is operatively independent from the engine 12, the transmission 16, and the first electronic power component 24. The second axle 30 includes a second electronic power component 32 having a second electronic power component output 34. The second electronic power component 32 may be one of an electric motor and a second motor-generator unit. The second axle 30 further includes a rear differential 36 configured to receive torque from the second electronic power component output 34, and further configured to transmit torque to the second set of drive wheels 38 to propel the vehicle 10.

The second electronic power component 32 receives its electrical energy from the energy storage device 26. Accordingly, the second electronic power component 32 is configured to drive the vehicle 10 independently from the engine 12 and to provide the vehicle 10 with an on-demand electric axle drive. The on-demand electric axle drive results in the vehicle 10 being operated in a purely electric vehicle or "EV mode." Furthermore, when both the first axle 18 and the second axle 30 are driven by their respective power sources, i.e., the engine 12 and the second electronic power component 32, the vehicle 10 is endowed with all-wheel drive, and may operate in an "electric all-wheel drive mode."

The power storage device 26, as described above, is electrically interconnected with the first electronic power component 24 and the second electronic power component 32. A first power inverter module 27 may operatively connect the first electronic power component 24 and the power storage device 26, and a second power inverter module 29 may operatively connect the second electronic power component 32 and the power storage device 26. The first and second power inverter modules 27, 29 may be configured to convert a power output from each of the respective first electronic power component 24 and the second electronic power component 32 to a suitable power input for the power storage device 26.

The power storage device 26 is configured to receive power from the first electronic power component 24 and transmit power to the second electronic power component 32 and other electronic devices requiring power throughout the vehicle 10.

The vehicle 10 further includes a controller 40 responsible for controlling the power management scheme of the vehicle 10. The controller 40 may be a stand-alone unit, or be part of an electronic controller that regulates the operation of the engine 12 and the first and second electronic power components 24, 32. The controller 40 may be embodied as a server/host machine or distributed system, e.g., a digital computer or microcomputer, acting as a vehicle control module, and/or as a proportional-integral-derivative (PID) controller device having a processor 51, and tangible, non-transitory memory 53 such as read-only memory (ROM) or flash memory. The controller 40 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. As envisioned herein, the controller 40 may be an electronic control unit (ECU) that is configured, i.e. programmed and equipped in hardware, to regulate and coordinate the hybrid propulsion of the vehicle 10, which includes the operation of the engine 12, the transmission 16, and the first and second electronic power components 24, 32.

In relatively steep grade environments or other high power demand situations, the second electronic power component 32 may require an additional power output from the power storage device 26, and, thus, may deplete the accumulated state of charge of the power storage device 26 at a higher rate, relative to more mild grades, in order to maintain operation in the EV mode or the electric all-wheel drive mode. In such situations, in order to provide adequate power to the second electronic power component 32 to maintain operation in the EV mode or the electric all-wheel drive mode, additional charge, in excess of that supplied by a conventional charger 42, may be needed by the power storage device 26.

Figure 2:
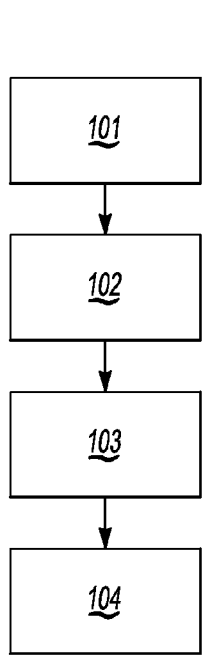
FIG. 2 is a flow diagram detailing a method of managing power in the all-wheel drive hybrid vehicle.

To provide this additional charge to the power storage device 26, the controller 40 executes a series of control steps to manage the power in a hybrid vehicle 10, as detailed by the present method 100, an example of which is shown in FIG. 2. In managing the power of the vehicle 10, the controller 40 increases a power output of the first electronic power component 24, by increasing the speed of the engine 12. The increased power output of the first electronic power component 24 to the power storage device 26 allows the power storage device 26 to provide continuous power to the second electronic power component 32, as detailed in FIGS. 2 and 3.

Referring to FIG. 2, the controller 40 executes the present method 100 for managing power in the hybrid vehicle 10. At step 101, the controller 40 executes a first power management scheme, wherein the controller 40 determines an engine speed for the engine 12 and an engine torque for the engine 12 based on a first user input. The first user input may be one of an acceleration request and a declaration request, e.g., as requested by a driver of the vehicle 10 via a throttle or brake pedal, respectively.

Figure 3:
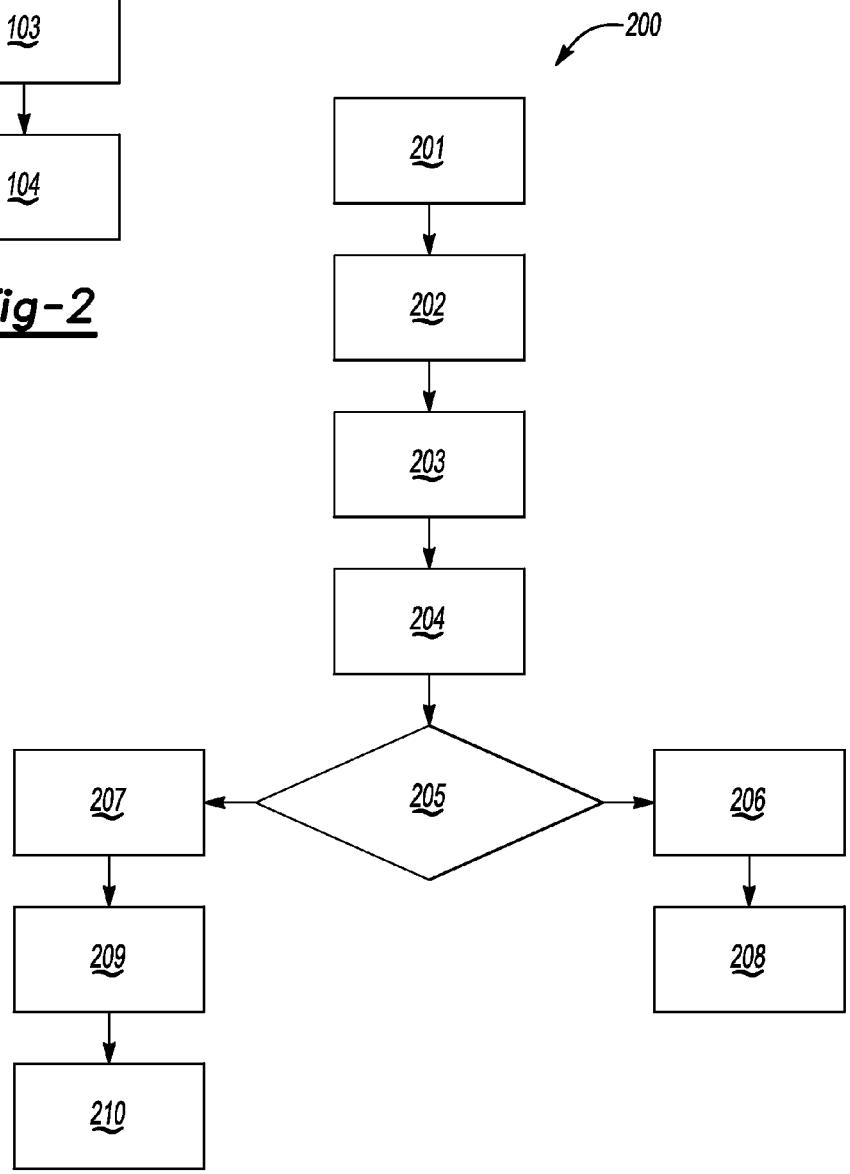
FIG. 3 is a flow diagram detailing a second power management scheme.

At step 102, the controller 40 detects a request to transition from the first power management scheme to a second power management scheme 200 (detailed in FIG. 3). The second management scheme 200 includes providing additional power to the power storage device 26 with the first electronic power component 24 to allow the power storage device 26 to supply the second electronic power component 32 with continuous power. Supplying the second electronic power component 32 with continuous power allows the vehicle 10 of FIG. 1 to maintain operation in the "EV mode" or the "electric all-wheel drive mode", when the power storage device 26 experiences a high demand situation, such as when the vehicle 10 scales a large grade. In the example embodiment of FIG. 1, the first electronic power component 24 is a motor-generator unit.

At step 103, the controller 40 transitions the vehicle 10 of FIG. 1 from the first power management scheme to the second power management scheme 200. At step 104, the controller 40 executes the second power management scheme 200.

The second power management scheme 200 is detailed in FIG. 3. At step 201, the controller 40 of FIG. 1 determines a current state of charge of the power storage device 26 and a target state of charge of the power storage device 26, and calculates the delta thereof. At step 202, the controller 40 utilizes the delta state of charge calculated at step 201, to calculate a target power output of the first electronic power component 24 required to increase the state of charge of the power storage device 26 from the current state of charge to the target state of charge.

At step 203, the controller 40 estimates a predicted resultant temperature of the first electronic power component 24 as a result of producing the target power output calculated at step 202. In estimating the predicted resultant temperature, the controller 40 may take into account the capabilities of a cooling system (not shown) incorporated in the vehicle 10.

At step 204, the controller 40 compares the predicted resultant temperature of the first electronic power component 24 to a predetermined temperature threshold 44 for the first electronic power component 24. The predetermined temperature threshold 44 may be stored on the electrically erasable programmable read-only memory of the controller 40.

At step 205, the controller 40 executes one of a first control action 206 and a second control action 207. The controller 40 may execute the first control action 206, when the predicted resultant temperature is less than the predetermined temperature threshold 44 of the first electronic power component 24. The controller 40 may execute the second control action 207, when the predicted resultant temperature exceeds the predetermined temperature threshold 44 of the first electronic power component 24.

In executing the first control action 206, at step 208, the controller 40 commands the transmission 16 to complete a gear downshift to increase the operating speed of the engine 12. Increasing the operating speed of the engine 12 increases the power output of the first electronic power component 24, thus allowing the first electronic power component 24 to produce the target power output, as calculated at step 202, to the power storage device 26. With this additional power, the power storage device 26 is capable of providing continuous power to the second electronic power component 32.

As a result of the predicted resultant temperature being in excess of the predetermined temperature threshold 44 for the first electronic power component 24, the controller 40, of FIG. 1, executes the second control action 207. In executing the second control action 207, the controller 40 ascertains the maximum amount of power output, i.e., the revised power output, of the first electronic power component 24 that may be produced without exceeding the predetermined temperature threshold 44, i.e. temperature constraints of the hardware components of the first electronic power component 24.

At step 209, the controller 40 compares the predetermined temperature threshold 44 to a series of predetermined values in a regression model or look-up table 49 to generate the revised power output for the first electronic power component 24. Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ a Structured Query Language (SQL) in addition to a language for creating, storing, editing, and executing stored procedures.

At step 210, the controller 40, commands the transmission 16 to complete a gear downshift to increase the operating speed of the engine 12 to allow the first electronic power component 24 to produce the revised power output, as calculated at step 209. This increases the amount of power supplied to the power storage device 26 to supplement power to the second electronic power component 32.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of managing power in a hybrid vehicle having an engine and a transmission, the method comprising:
    executing, via a controller, a first power management scheme, wherein the controller determines an engine speed and an engine torque based on a first user input, the first user input defined as one of an acceleration request and a deceleration request;
    detecting, via the controller, a request to transition the vehicle from the first power management scheme to a second power management scheme;
    transitioning the vehicle, via the controller, from the first power management scheme to the second power management scheme; and
    executing the second power management scheme, via the controller, such that a first electronic power component provides additional power to a power storage device and the power storage device provides continuous power to a second electronic power component, wherein executing the second power management scheme includes:
        determining a current state of charge and a target state of charge of the power storage device;
        calculating a target power output of the first electronic power component required to increase the state of charge of the power storage device from the current state of charge to the target state of charge;
        estimating a predicted resultant temperature of the first electronic power component as a result of producing the target power output;
        comparing the predicted resultant temperature of the first electronic power component to a predetermined temperature threshold for the first electronic power component;
        executing one of a first control action and a second control action, wherein:
            the controller executes the first control action when the predicted resultant temperature is below the predetermined temperature threshold, such that the first control action includes commanding, via the controller, the transmission to complete a gear downshift to increase the operating speed of the engine, such that the first electronic power component produces the target power output; and
            the controller executes the second control action when the predicted resultant temperature exceeds the predetermined temperature threshold, such that the second control action includes:
                generating, via the controller, a revised power output for the first electronic power component based on the predetermined temperature threshold of the first electronic power component by matching the predetermined temperature threshold to one of a series of predetermined power output values that correspond to predetermined temperature values in a look-up table; and commanding, via the controller, the transmission to complete a gear downshift to increase the operating speed of the engine, such that the first electronic power component produces the revised power output.

2. The method of claim 1, wherein the first electronic power component is a first motor-generator unit.

3. The method of claim 1, wherein the engine is configured to drive the vehicle via a first set of drive wheels, and wherein the a second electronic power component is configured to drive the vehicle via a second set of drive wheels, such that the second electronic power component has a second electronic power component output operatively connected to a rear differential, the rear differential being configured to receive torque from the second electronic power component output and further configured to transmit torque to the second set of drive wheels.

4. The method of claim 3, wherein the second electronic power component is one of an electric motor and a second motor generator unit.

5. A system for managing power in an all-wheel drive hybrid vehicle comprising:
    an internal combustion engine configured to drive the vehicle via a first set of drive wheels;
    a transmission configured to receive torque from the internal combustion engine and adjust an engine speed of the internal combustion engine;
    a first electronic power component configured to start the engine;
    a second electronic power component having a second electronic power component output, the second electronic power component configured to drive the vehicle via a second set of drive wheels;
    a power storage device electrically interconnected with the first electronic power component and the second electronic power component, the power storage device configured to receive power from the first electronic power component and further configured to transmit power to the second electronic power component; and
    a controller configured to:
        execute a first power management scheme, wherein executing the first power management scheme includes determining a desired engine speed for the engine and a desired engine torque for the engine based on a first user input, the first user input defined as one of an acceleration request and a deceleration request;
        detect a request to transition the vehicle from a first power management scheme to a second power management scheme;
        transition the vehicle from the first power management scheme the second power management scheme in response to the request; and
        execute a second power management scheme, wherein executing the second power management scheme includes increasing a power output of the first electronic power component to provide additional power to the power storage device, and wherein increasing a power output of the first electronic power component to provide additional power to the power storage device includes:
    determining a current state of charge of the power storage device and a target state of charge of the power storage device;
    calculating a target power output of the first electronic power component required to increase the state of charge of the power storage device from the current state of charge to the target state of charge;
    predicting a predicted resultant temperature of the first electronic power component as a result of producing the target power output;
    comparing the predicted resultant temperature of the first electronic power component to a predetermined temperature threshold for the first electronic power component; and
    executing one of a first control action and a second control action, wherein:
        the controller executes the first control action when the predicted resultant temperature is below the predetermined temperature threshold, such that the first control action includes commanding the transmission to complete a gear downshift to increase the operating speed of the engine, such that the first electronic power component produces the target power output; and
        the controller executes the second control action when the predicted resultant temperature exceeds the predetermined temperature threshold, such that the second control action includes:
            generating a revised power output for the first electronic power component based on the predetermined temperature threshold by matching the predetermined temperature threshold to one of a series of predetermined power output values that correspond to predetermined temperature values in a look-up table; and
            commanding the transmission to complete a gear downshift to increase the operating speed of the engine, such that the first electronic power component produces the revised power output.

6. The system of claim 5, wherein the first electronic power component is a first motor-generator unit.

7. The system of claim 5, wherein the second electronic power component is one of an electric motor and a second motor-generator unit.

8. The system of claim 7, wherein the second electronic power component is a second motor-generator unit.

9. The system of claim 7, wherein the second electronic power component is an electric motor.

10. The system of claim 5, wherein the power storage device is a high voltage battery pack.

11. The system of claim 5, wherein the system further includes a rear differential configured to receive torque form the second electronic power component output and transmit torque to the second set of drive wheels.

12. The system of claim 5, wherein the transmission is a manual transmission.

13. The system of claim 5, wherein the transmission is an automatic transmission.

* * * * *